US010235765B1

(12) United States Patent
Charlton et al.

(10) Patent No.: US 10,235,765 B1
(45) Date of Patent: Mar. 19, 2019

(54) METHOD OF COMPARING A CAMERA FINGERPRINT AND A QUERY FINGERPRINT

(71) Applicant: The United States of America as represented by the Director, National Security Agency, Washington, DC (US)

(72) Inventors: Sarah T. Charlton, Frederick, MD (US); Katelyn J. Meixner, Columbia, MD (US)

(73) Assignee: The United States of America, as represented by Director National Security Agency, Washington, DC (US)

( * ) Notice: Subject to any disclaimer, the term of this patent is extended or adjusted under 35 U.S.C. 154(b) by 303 days.

(21) Appl. No.: 15/279,928

(22) Filed: Sep. 29, 2016

(51) Int. Cl.
*G06T 7/32* (2017.01)
*G06T 7/37* (2017.01)

(52) U.S. Cl.
CPC . *G06T 7/32* (2017.01); *G06T 7/37* (2017.01)

(58) Field of Classification Search
None
See application file for complete search history.

(56) References Cited

U.S. PATENT DOCUMENTS 7,616,237 B2 * 11/2009 Fridrich ................ G06K 9/40
348/207.99
8,228,405 B2 * 7/2012 Liberman ............ H04N 5/2176
348/241
8,374,386 B2 * 2/2013 Bayram ............ G06F 17/30799
382/100

(Continued)

OTHER PUBLICATIONS

Goljan, M. et al., "Camera Identification from Cropped and Scaled Images", Proc. SPIE Electronic Imaging, Security, Steganography, and Watermarking of Multimedia Contents X, San Jose, CA, pp. OE-1-OE-13, Jan. 2008.

(Continued)

*Primary Examiner* — Iman K Kholdebarin

(57) ABSTRACT

The present invention discloses a method for comparing a camera fingerprint to a query fingerprint. An estimate of a camera fingerprint is obtained from a set of one or more images, and the query fingerprint is obtained from one or more images. Using these values, normalized cross-correlations values are determined for each possible alignment of the two fingerprints. Prior to calculating the noise floor, a set including the highest normalized cross-correlation values is identified. A universal noise floor is then calculated excluding this set from the noise floor calculation. The universal noise floor is utilized in calculating a correlation energy for each possible shift. The correlation energy values are then examined to determine whether the camera fingerprint and the query fingerprint match. A visualization tool may also be used to compare the camera fingerprint and the query fingerprint and determine whether the camera fingerprint and the query fingerprint match. The visualization tool may provide a plot utilizing surfaces or heat maps. The plots allow for a quick and easy analysis and determination as to whether the camera fingerprint and the query fingerprint match.

14 Claims, 12 Drawing Sheets

(56) References Cited

U.S. PATENT DOCUMENTS

| | | | | |
|---|---|---|---|---|
| 8,577,091 B2* | 11/2013 | Ivanov | ............... | G06K 9/00013 |
| | | | | 382/115 |
| 8,842,827 B2* | 9/2014 | Hammouri | .............. | H04L 9/083 |
| | | | | 380/44 |
| 8,942,430 B2* | 1/2015 | Ivanov | ............... | G06K 9/00006 |
| | | | | 382/115 |
| 8,953,848 B2* | 2/2015 | Ivanov | ............... | G06K 9/00013 |
| | | | | 382/115 |
| 9,111,120 B2* | 8/2015 | Feller | .................... | G06F 21/645 |
| 2015/0169936 A1* | 6/2015 | Ivanov | ............... | G06K 9/00013 |
| | | | | 382/124 |

OTHER PUBLICATIONS

Goljan, M. et al., "Large Scale Test of Sensor Fingerprint Camera Identification", Proc. SPIE Electronic Imaging, Media Forensics and Security XI, San Jose, CA, vol. 7245, pp. 0I-0J, Jan. 2009.

Lukas, J. et al., "Determining Digital Image Origin Using Sensor Imperfections", Proc. SPIE Electronic Imaging, San Jose, CA, pp. 249-260, Jan. 2005.

\* cited by examiner

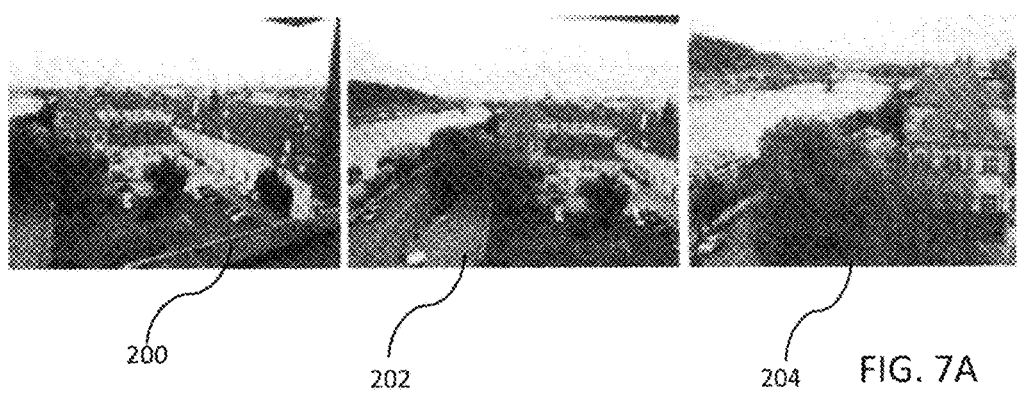
FIG. 7A
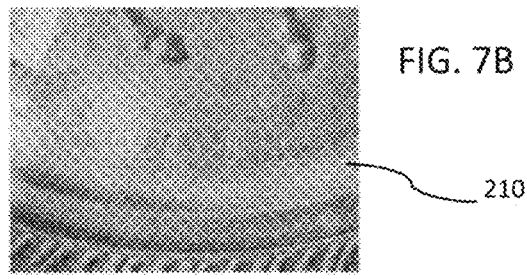
FIG. 7B
| | Transformed CE Value | | Transformed CE Value | | Transformed CE Value |
|---|---|---|---|---|---|
| 1 | 196.527 | 18 | 16.648 | 35 | 15.160 |
| 2 | 23.939 | 19 | 16.503 | 36 | 15.120 |
| 3 | 22.034 | 20 | 16.346 | 37 | 15.091 |
| 4 | 20.967 | 21 | 16.277 | 38 | 14.952 |
| 5 | 18.811 | 22 | 15.728 | 39 | 14.948 |
| 6 | 18.664 | 23 | 15.694 | 40 | 14.775 |
| 7 | 18.372 | 24 | 15.661 | 41 | 14.753 |
| 8 | 18.062 | 25 | 15.623 | 42 | 14.722 |
| 9 | 17.867 | 26 | 15.604 | 43 | 14.699 |
| 10 | 17.217 | 27 | 15.596 | 44 | 14.697 |
| 11 | 17.210 | 28 | 15.550 | 45 | 14.694 |
| 12 | 17.110 | 29 | 15.541 | 46 | 14.629 |
| 13 | 16.980 | 30 | 15.379 | 47 | 14.572 |
| 14 | 16.873 | 31 | 15.354 | 48 | 14.569 |
| 15 | 16.824 | 32 | 15.284 | 49 | 14.549 |
| 16 | 16.758 | 33 | 15.273 | 50 | 14.527 |
| 17 | 16.680 | 34 | 15.189 | | |
FIG. 8

| | Transformed CE Value | | Transformed CE Value | | Transformed CE Value |
|---|---|---|---|---|---|
| 1 | 29.961 | 18 | 15.988 | 35 | 14.994 |
| 2 | 20.659 | 19 | 15.987 | 36 | 14.959 |
| 3 | 19.071 | 20 | 15.781 | 37 | 14.955 |
| 4 | 18.688 | 21 | 15.730 | 38 | 14.829 |
| 5 | 18.088 | 22 | 15.624 | 39 | 14.803 |
| 6 | 18.020 | 23 | 15.537 | 40 | 14.788 |
| 7 | 17.841 | 24 | 15.479 | 41 | 14.770 |
| 8 | 17.736 | 25 | 15.464 | 42 | 14.727 |
| 9 | 17.481 | 26 | 15.419 | 43 | 14.691 |
| 10 | 17.464 | 27 | 15.227 | 44 | 14.690 |
| 11 | 17.391 | 28 | 15.197 | 45 | 14.667 |
| 12 | 17.337 | 29 | 15.192 | 46 | 14.643 |
| 13 | 17.069 | 30 | 15.181 | 47 | 14.615 |
| 14 | 16.313 | 31 | 15.151 | 48 | 14.578 |
| 15 | 16.181 | 32 | 15.134 | 49 | 14.540 |
| 16 | 16.125 | 33 | 15.099 | 50 | 14.510 |
| 17 | 16.004 | 34 | 15.082 | | |

METHOD OF COMPARING A CAMERA FINGERPRINT AND A QUERY FINGERPRINT

FIELD OF THE INVENTION

This invention is generally directed to camera fingerprinting.

BACKGROUND OF THE INVENTION

Researchers have used normalized cross-correlation values to determine, for example, how two images align with one another. For example, if two images are taken of the same object, it may be helpful to align the images to find points of commonality between the images. To determine the alignment which provides the best match between the images, the first image is shifted relative to the second image, pixel by pixel. For each possible shift, a normalized cross-correlation (NCC), ρ, is calculated. Once an NCC value is calculated for each possible shift, the maximum NCC value is identified and provides a determination of the best alignment between the images. This maximum NCC value is identified as $\rho(s_{peak})$; i.e. the normalized cross correlation associated with the shift resulting in the maximum NCC value. The distribution of NCC values will depend on the composition of the images, or more specifically, their pixel values. It is beneficial to evaluate the NCC values independent of the image composition to allow for the selection of a universal match threshold across images. An evaluation independent of the image composition is estimated by calculating a correlation energy (CE). The CE is provided by a ratio of the NCC value associated with a particular shift to a noise floor, where the noise floor represents an average of all NCC values associated to non-matching alignments of the images. Once a CE value for each possible shift has been determined, the maximum CE value identifies the shift associated with the best alignment of the images. Preferably, the CE for a particular shift will be far greater than the CE associated with all other shifts. In this way, it is easy to identify which shift provides the best alignment between the images.

In calculating the noise floor, later researchers observed that the NCC value for a particular shift was often similar to the NCC values for neighboring shifts. Similar NCC values for neighboring shifts were observed because the characteristics of an image at neighboring pixels is often similar. An image 20 illustrating this observation is provided in FIG. 1 where characteristics of the image pixels at a first location 22 are compared to characteristics of the image pixels at a second location 24. FIG. 1A illustrates enlargement of the image 20 at the first location 22 to illustrate characteristics of the image pixels 22a at this location. FIG. 1B illustrates enlargement of the image 20 at the second location 24 to illustrate characteristics of the image pixels at this location. It is to be understood that the enlargements 22a, 24a of the locations 22, 24 are not drawn to scale and are only used for illustrative purposes. FIG. 1A illustrates central pixel A along with neighboring pixels $B_1$-$B_8$. FIG. 1B illustrates central pixel $C_5$ along with neighboring pixels $C_1$-$C_4$ and $C_6$-$C_9$. As illustrated in FIG. 1A, the characteristics of image pixel A are similar to the characteristics of the neighboring image pixels $B_1$-$B_8$, and the characteristics of image pixel $C_5$ are similar to the characteristics of the neighboring image pixels $C_1$-$C_4$ and $C_6$-$C_9$. In contrast, the characteristics of image pixel A are not similar to the characteristics of the distant image pixels $C_1$-$C_9$ and the characteristics of image pixel $C_5$ are not similar to the characteristics of the distant image pixels A and $B_1$-$B_8$. The similarity of the image characteristics at neighboring image pixels results in similar NCC values for neighboring pixels. For example, if the NCC value at pixel A is high, the NCC values associated with pixels $B_1$-$B_8$, will likely also be high, artificially inflating the noise floor calculation. Consequently, all of the CE values calculated from the NCC values will be similar (i.e. will fall within a relatively small range), making it difficult to identify the best alignment of the images, particularly when a visualization tool is utilized to make this identification.

To compensate for the similarity of the neighboring image pixels, researchers provided for a calculation of the noise floor which eliminates NCC values for shifts neighboring a chosen shift value. Specifically, rather than using all of the NCC values to calculate the noise floor, the noise floor is calculated using the NCC values corresponding to shifts outside of a chosen neighborhood of a shift. The NCC values are calculated for each possible shift, however, in calculating the noise floor for a selected shift, the NCC value for shifts associated with an 11 pixel by 11 pixel neighborhood surrounding the selected pixel shift are not included. The 11×11 pixel neighborhood is provided by an 11×11 portion of the shifted image, where the 11×11 neighborhood is a square centered at the selected pixel. See FIG. 1A for an example of a 3×3 neighborhood centered at pixel A. Thus, a shift-specific noise floor is provided for each possible shift.

Utilizing the shift-specific noise floor, the CE for each possible shift is calculated. Although the calculation of each CE requires the calculation of a shift-specific noise floor, the resulting CE values provide a clearer distinction between the higher and lower NCC values and therefore provides an easier indication of the best alignment of the images.

The CE calculation utilized to align images was later used in camera fingerprinting. When a digital camera takes an image, the shutter opens, and light from the scene photographed travels through the camera lens and is registered on the imaging sensor, such as a charge coupled device. Ideally, the amount of charge output at each pixel on the imaging sensor should represent the true light intensity entering the camera. However, natural physical variations in the imaging sensor imprint a distinctive sensor pattern noise, or "fingerprint" on the image.

Just as a fingerprint uniquely identifies an individual, sensor pattern noise on an image uniquely links the image to a specific physical camera. Researchers established that it is possible to extract a sensor pattern from image noise that is unique to a particular camera, acting as the camera's "fingerprint." Their method for linking a digital image to a particular camera is stable and robust.

$I_{i,j}$ is utilized to denote the image signal at a pixel (i, j) in one color channel, where i=1 . . . n, j=1 . . . m, and m, n are the image dimensions. $I^0$ is utilized to denote the ideal sensor output in the absence of noise or imperfections, i.e., the "true scene" or noiseless image. Dropping indices for readability, a sensor output is represented as:

$$I = I^0 + I^0 K + \theta$$

where K is responsible for the camera's sensor fingerprint and θ is a statistical noise term. It is noted that all operations are element-wise, as opposed to a matrix operation. K represents the camera's photo response non-uniformity (PRNU) factor and can be estimated from a set of images. An estimate of K, which can be denoted as $\hat{K}$ serves as the camera's fingerprint. As illustrated in FIG. 2, a plurality of images 30 are utilized to produce an estimated fingerprint

32. A portion of the estimated fingerprint 32 is enlarged at 34 to illustrate the variation in the values of the fingerprint pixels.

Once a camera fingerprint has been determined, the likelihood that a given image (i.e., a query image) was taken with that camera, is tested using a two-channel hypothesis. The notation, $K_1$, represents the fingerprint of the camera in question. The notation, $K_2$, represents the fingerprint of a hypothetical second camera used to take the query image (i.e. the query fingerprint). A first hypothesis $H_0$ provides that if $K_1 \neq K_2$, then the query image was not taken from the camera in question. The second hypothesis $H_1$, provides that if $K_1 = K_2$, then the query image was taken from the camera in question. For simplicity, it is assumed that the query image has not undergone any geometrical processing, except perhaps cropping. To determine whether the query fingerprint is a good match with the estimated camera fingerprint, $\hat{K}_1$, it is first determined how the possibly cropped query image overlays or aligns with the camera fingerprint, $\hat{K}_1$. That is, the shift of the query fingerprint relative to the camera fingerprint or vice versa $(s_x, s_y)$ that will best align the two fingerprints. $s_x$ represents a shift in the horizontal direction and $s_y$ represents a shift in the vertical direction.

Utilizing the NCC calculations which provided earlier researchers with a tool for aligning two images, the NCC calculations are utilized to align the camera fingerprint, $K_1$, with the query fingerprint $K_2$. It is noted that the notation, $\hat{K}$, has been replaced with K for simplification. The NCC, $\rho$, between the two fingerprints is calculated for all possible shifts utilizing:

$$\rho(s_x, s_y; K_1, K_2) = \frac{\sum_{i=1}^{m}\sum_{j=1}^{n}(K_1[i,j]-\overline{K_1})(K_2[i+s_x, j+s_y]-\overline{K_2})}{\|K_1-\overline{K_1}\|\|K_2-\overline{K_2}\|}$$

The highest NCC value should identify the best alignment between a query fingerprint and a camera fingerprint. As noted above in connection with the process for aligning two images, a correlation energy ratio (CE) provides for normalization of the NCC value relative to a noise floor and therefore depends less on the image composition than would a simple comparison of the NCC values. Similarly when comparing fingerprints, it is preferable to utilize a CE value rather than a NCC value in order to diminish the impact of the image composition. In addition, use of the CE values allows for selection of a universal threshold to be used for all fingerprint comparisons.

Following the earlier method for matching images, which provided for the elimination of neighboring NCC values from the noise floor calculation, researchers working with fingerprints again eliminated the neighboring NCC values from the noise floor calculation. The correlation energy for each shift was calculated utilizing:

$$CE = \frac{\rho(s_x, s_y; K_1, K_2)^2}{\frac{1}{mn-|N|}\sum_{s,s\notin N_s}\rho(s_x, s_y; K_1, K_2)^2}$$

where $$\frac{1}{mn-|N|}\sum_{s,s\notin N_s}\rho(s_x, s_y; K_1, K_2)^2$$

provides a calculation of the noise floor and $N_s$ identifies shifts in a neighborhood of shift s. Thus, similar to the method for comparing images, the method for comparing fingerprints provides for the calculation of a shift-specific noise floor for each possible shift. More specifically, NCC values were calculated for all possible shifts; a neighborhood surrounding the shift was identified; for each shift, a shift-specific noise floor was calculated (eliminating the NCC values for neighboring shifts); and the CE value was calculated at each shift using the shift-specific noise floor.

Once the CE values at each shift are calculated, the CE values are then compared to determine the maximum, or peak CE value, PCE. This PCE value identifies the shift providing the best alignment of the camera fingerprint and the query fingerprint. A CE threshold is set, and the PCE is compared to the CE threshold. In the event the PCE exceeds the CE threshold, the hypothesis, $H_0$, is rejected and it is determined that the query image originated from the camera in question; i.e., the hypothesis $H_1$, is supported. Researchers at Binghamton University empirically found a CE threshold of 60 to be a reasonable value for matching an image to a camera fingerprint.

In some cases, visualization tools are utilized to analyze the CE values. FIG. 3 illustrates the use of a visualization tool to analyze CE values. The visualization tool provides a plot 50 wherein the CE value associated with each shift is represented by plotting a vertical line 52 at a location associated with the shift. The height of the plotted vertical line 52 represents the CE value. It is preferable to plot the CE values associated with all shifts on a single plot 50 in order to make comparisons between the CE values. In order to plot all CE values, the vertical line 52 associated with each CE value must have limited width. The resulting CE graph provides a large number of dense vertical lines 52 of limited width. This density and limited width makes it difficult to identify the PCE. For example, in FIG. 3 the PCE is provided at the location associated with shift (0, 0). Given the nature of the PCE plot, however, it is difficult to identify the PCE.

It is noted that this method for comparing a camera fingerprint and a query fingerprint requires a significant number of calculations. In particular, in order to calculate the CE value for a particular shift, a shift-specific noise floor must first be calculated. Further, the shift-specific noise floor requires identification of shift-specific neighboring NCC values. It is further noted that the visualization tool utilized for evaluating the CE values does not allow for the determination of a PCE with ease. An improved method for comparing camera and query fingerprints is therefore required.

SUMMARY OF THE INVENTION

Briefly, the present invention discloses a method for comparing a given camera fingerprint to a query fingerprint. This encompasses the comparison of a camera fingerprint with a query fingerprint associated to a single image. Normalized cross-correlations values between the camera and query fingerprint estimates are determined for each possible alignment or shift. Prior to calculating the noise floor, a subset including the highest normalized cross-correlation values is identified. A universal noise floor is then calculated excluding this set from the noise floor calculation. The universal noise floor is utilized in calculating a correlation energy for each possible shift. The correlation energy values are then examined to determine whether the camera fingerprint and query fingerprint match. A visualization tool may also be used to determine whether the camera fingerprint matches the query fingerprint. The visualization tool may include elliptic paraboloids relating to the correlation energy associated with particular shifts. These elliptic paraboloids allow for a quick and easy analysis and determination as to whether the camera fingerprint and the query fingerprint match. Further, the visualization tool improves efficiency by only calculating the correlation energy at prospective matching alignments or the largest NCC values.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which:

FIG. 7A illustrates images used to create a camera fingerprint described in Examples 1 and 2;

FIG. 7B illustrates an image used to create a query fingerprint described in Example 1;

FIG. 8 illustrates a table of transformed CE values derived from Example 1;

DETAILED DESCRIPTION OF THE PREFERRED EMBODIMENT

Figure 1:
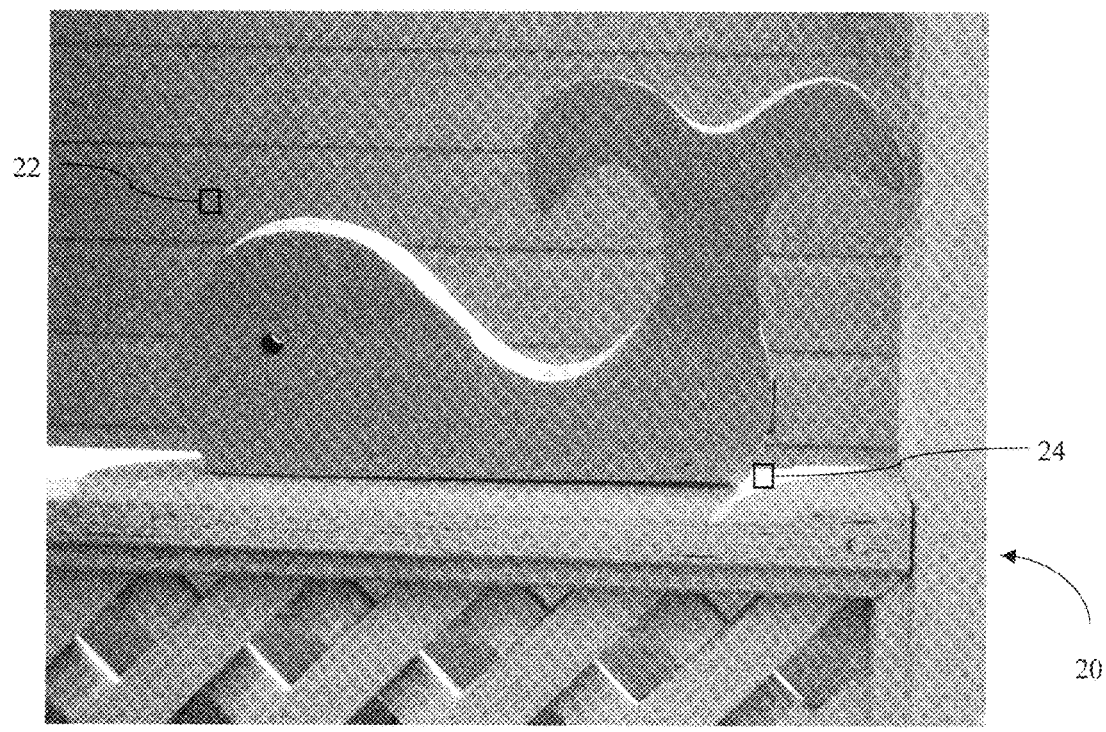
FIG. 1 illustrates an image produced by a camera.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The invention provides a method for comparing a query fingerprint and a camera fingerprint. If a determination can be made that the prints match, it is determined that the query image originated from the camera which produced the camera fingerprint.

Figure 1A:
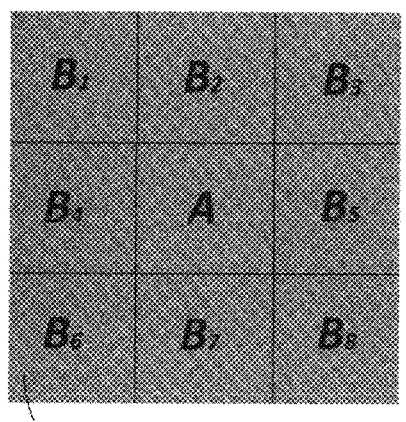
FIG. 1A illustrates image pixels associated with a portion of the image of FIG. 1.
Figure 1B:
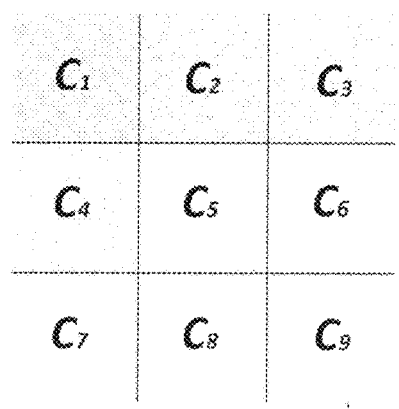
FIG. 1B illustrates image pixels associated with a portion of the image of FIG. 1.
Figure 2:
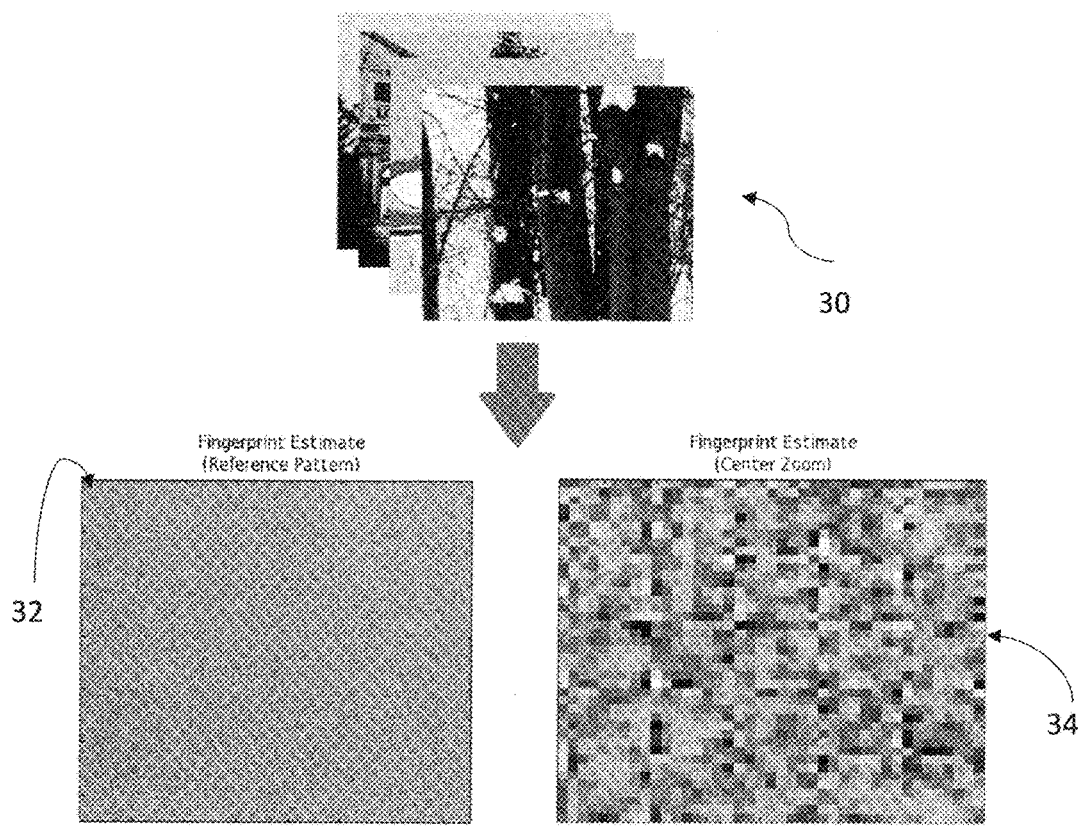
FIG. 2 illustrates a set of images along with a fingerprint derived from the images and an enlargement of a portion of the fingerprint.
Figure 4A:
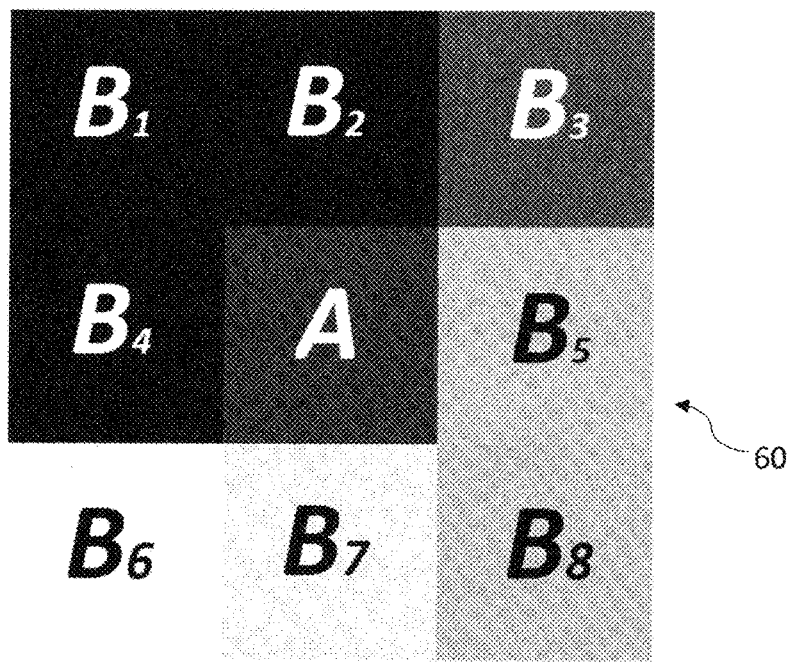
FIG. 4A illustrates pixels of a fingerprint derived from the image of FIG. 1.
Figure 4B:
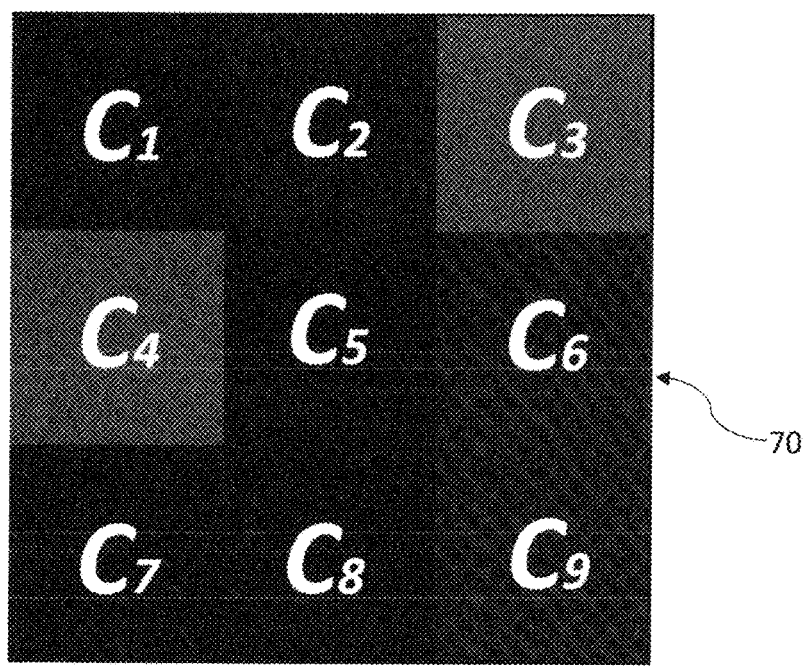
FIG. 4B illustrates pixels of a fingerprint derived from the image of FIG. 1.

This invention recognizes the inventors' discovery that in the context of comparing fingerprints, as opposed to images, the assumption that nearby pixels are similar is incorrect. Thus, in calculating correlation energy values, the elimination of NCC values relating to neighboring shifts does not provide an improvement to the CE calculation. FIGS. 4A and 4B illustrate enlargement of portions of a fingerprint derived from the image of FIG. 1. FIG. 4A illustrates a portion 60 of the fingerprint associated with pixels from the first location 22 of FIG. 1 and FIG. 4B illustrates the portion 70 of the fingerprint associated with the pixels from the second location 24 of FIG. 1. As illustrated, the characteristics of the fingerprint pixels of FIGS. 4A and 4B are unlike the characteristics of the image pixels of FIGS. 1A and 1B. Furthermore, the center fingerprint pixel A is not similar to the neighboring fingerprint pixels $B_1$-$B_8$. Likewise, the characteristics of the center fingerprint pixel $C_5$ is not necessarily similar to its neighboring fingerprint pixels $C_1$-$C_4$ and $C_6$-$C_9$. As a result, elimination of the neighboring pixels ($B_1$-$B_8$) from the noise floor calculation relating to pixel A and the elimination of neighboring pixels $C_1$-$C_4$ and $C_6$-$C_9$ from the noise floor calculation relating to pixel $C_5$, does not provide improved accuracy of the CE values.

Although there is no reason to eliminate neighboring NCC values when comparing a camera fingerprint to the query fingerprint, a desire remains to provide differentiation of the NCC values in order to more readily compare high NCC values with the noise floor. When alignment is provided between the camera fingerprint and the query fingerprint, high NCC values occur at various and perhaps scattered locations within the image. The decentralized alignment of NCC values results from the fact that the fingerprints relate to the natural physical variations in the camera sensor at particular pixels. Unlike images wherein similarities are often found in nearby pixel, the physical variations in the sensor are not provided in a centralized or concentrated location but rather are typically scattered about the camera sensor. Thus, to improve the noise floor calculation in the context of fingerprint comparison, it is necessary to identify the high NCC values scattered throughout the image. By doing so, differentiation between the NCC values and the noise floor may be exaggerated. As a result, an improved tool is provided for comparing a query fingerprint to a camera fingerprint as discussed in detail below.

Figure 5A:
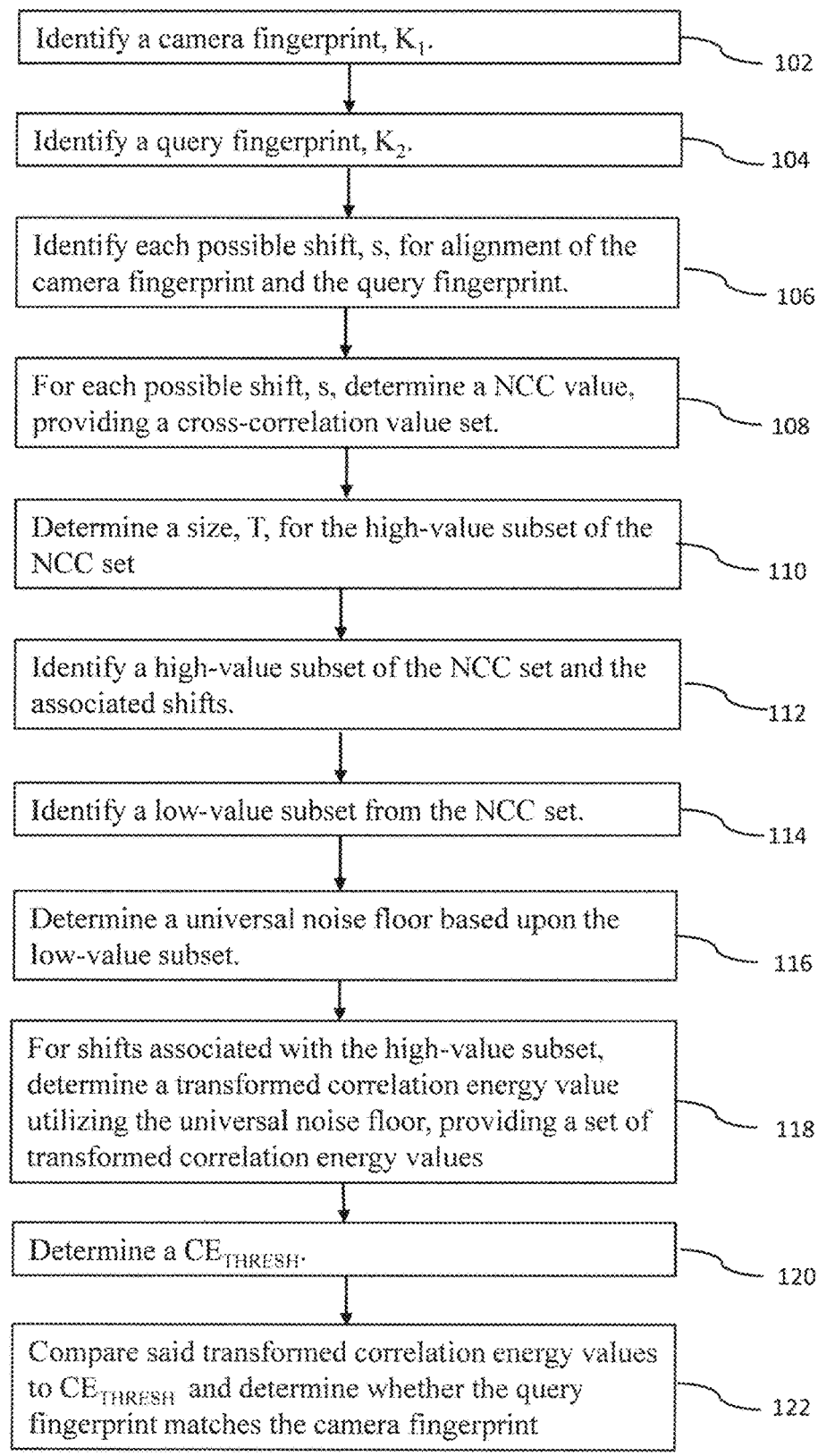
FIG. 5A is a flow chart illustrating steps of an embodiment of the method of the present invention.
Figure 5B:
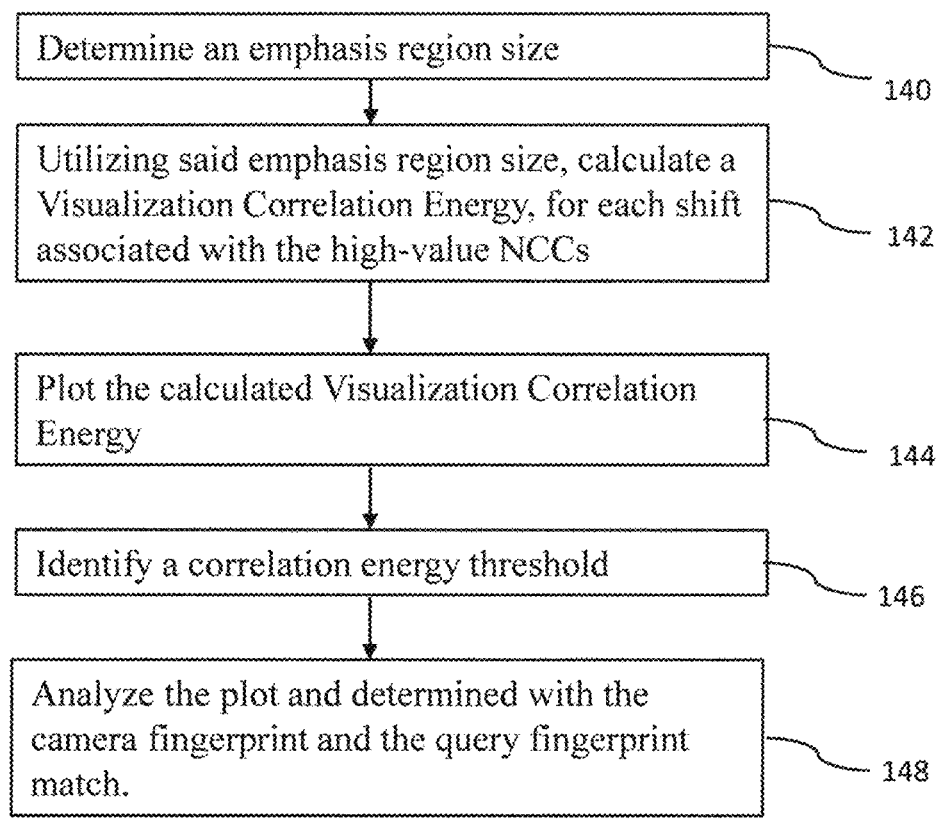
FIG. 5B is a flow chart illustrating steps of an embodiment of the visualization tool of the present invention.

Turning to FIG. 5a, the method of the present invention begins at step 102 by identifying a camera fingerprint, $K_1$. The camera fingerprint is represented by a matrix of real numbers which reflects the unique characteristics of the camera sensor used to capture the image(s). Although the camera fingerprint is typically derived from a set of images captured by the camera, if multiple images are not available, the camera fingerprint may be derived from a single image. Although one method for identifying a fingerprint has been described above, any one of a variety of methods are available for identifying the camera fingerprint and may be utilized with the present invention.

At step 104, a query fingerprint, $K_2$, is identified. The query fingerprint is represented by a matrix of real numbers which reflects the unique characteristics of the camera sensor used to capture the query image(s). A single query image may be used to provide the query fingerprint or a set of images captured by a single camera may be used to provide the query fingerprint. Although one method for identifying a fingerprint has been described above, any one of a variety of methods are available for identifying the query fingerprint and may be utilized with the present invention.

To determine whether the query fingerprint, $K_2$, is a match with the camera fingerprint, $K_1$, it is first determined how the camera fingerprint and the query fingerprint align. A shift, s, is utilized in an attempt to best align the camera fingerprint and the query fingerprint. The shift s includes a shift in the horizontal direction, $s_x$, and a shift in the vertical direction, $s_y$. At step 106, each possible shift between camera fingerprint, $K_1$, and query fingerprint, $K_2$ is identified.

At step 108, for each possible shift, s, a normalized cross-correlation (NCC) value is calculated, utilizing:

$$\rho(s_x, s_y; K_1, K_2) = \frac{\sum_{i=1}^{m}\sum_{j=1}^{n}(K_1[i,j] - \overline{K_1})(K_2[i+s_x, j+s_y] - \overline{K_2})}{\|K_1 - \overline{K_1}\|\|K_2 - \overline{K_2}\|}$$

The normalized cross-correlation (NCC), $\rho$, represents the relationship between the camera's fingerprint, $K_1$, and the query fingerprint, $K_2$, at each possible shift. Calculating the NCC for each possible shift provides a set of NCC values (NCC Set).

At step 110, a high-value subset size, T, is determined. A high-value subset of the NCC Set of values will be identified. This subset of the NCC Set will include the highest values of the NCC Set. The size of this subset may vary and is identified as T. If desired, the high-value subset size, T, may be user defined. In an example described below, for instance, the NCC Set provides 750,000 values and the high-value subset size, T, is selected to be 50. As will be discussed below, several factors are utilized to determine the size, T, of the high-value subset. At step 112, using the high-value subset size, T, the highest values of the NCC Set are identified as members of the high-value NCC subset. Thus, if the set size, T, is selected to be 50, the high-value subset will include the 50 highest values of the NCC Set.

At step 114, the values of the NCC Set that were not identified in the high-value NCC subset are identified in a low-value NCC subset.

As discussed above, a noise floor calculation which is meaningful for comparing fingerprints is needed. This meaningful noise floor calculation is provided by a universal noise floor calculation. At step 116, a universal noise floor is calculated as follows:

$$\frac{1}{mn - T}\sum_{s',s' \neq s_1,\ldots s_T}\rho(s'; K_1, K_2)^2$$

where mn is the size of the NCC matrix; $s_1, \ldots, s_T$ identifies the shifts associated with the high-value subset; and s' is an element of the low-value subset; i.e., the set of all possible shifts excluding the T shifts associated with the high-value NCCs. As evidenced by the formula provided, the noise floor calculation yields a value that does not depend upon the alignment of the camera and query fingerprints. The universal noise floor is provided by a single value which is independent of a given shift.

Normalization of the NCC values is provide by calculating a correlation energy associated with a shift. At step 118 a transformed correlation energy is calculated utilizing the universal noise floor calculation:

$$CE(s) = \frac{\rho(s; K_1, K_2)^2}{\frac{1}{mn - T}\sum_{s',s' \neq s_1,\ldots s_T}\rho(s'; K_1, K_2)^2}$$

Because it is only necessary to evaluate the highest transformed CE values, it is noted, that a transformed correlation energy need not be calculated for each shift. Rather, the transformed CE need only be calculated for the shifts associated with the high-value subset.

At step 120, a correlation energy threshold, $CE_{THRESH}$, is selected. For example, $CE_{THRESH}$ may be selected to be approximately 60. It is noted that a variety of values may be selected for $CE_{THRESH}$ so long as the correlation energy threshold provides an indication that the transformed CE values exceeding the threshold indicate a low probability of obtaining a false indication that the fingerprints match.

At step 122 an analysis of the transformed correlation energy values may be made. The transformed CE values are compared to the selected $CE_{THRESH}$ to determine the number of transformed CE values, if any, exceeding $CE_{THRESH}$. With this determination, an analysis may be performed to determine whether the camera fingerprint and the query fingerprint match. This analysis may be made in a variety of manners as determined by the user. For example, it may be determined that if a single transformed CE value exceeds $CE_{THRESH}$, a determination may be made that the query fingerprint matches the camera fingerprint; and if no transformed CE value exceeds $CE_{THRESH}$, a determination may be made that the query fingerprint does not match the camera fingerprint. In another scenario, multiple transformed CE values may be found to exceed $CE_{THRESH}$. In this scenario, the user may determine that further analysis is required before making a determination as to whether the query fingerprint and the camera fingerprint match.

Figure 6A:
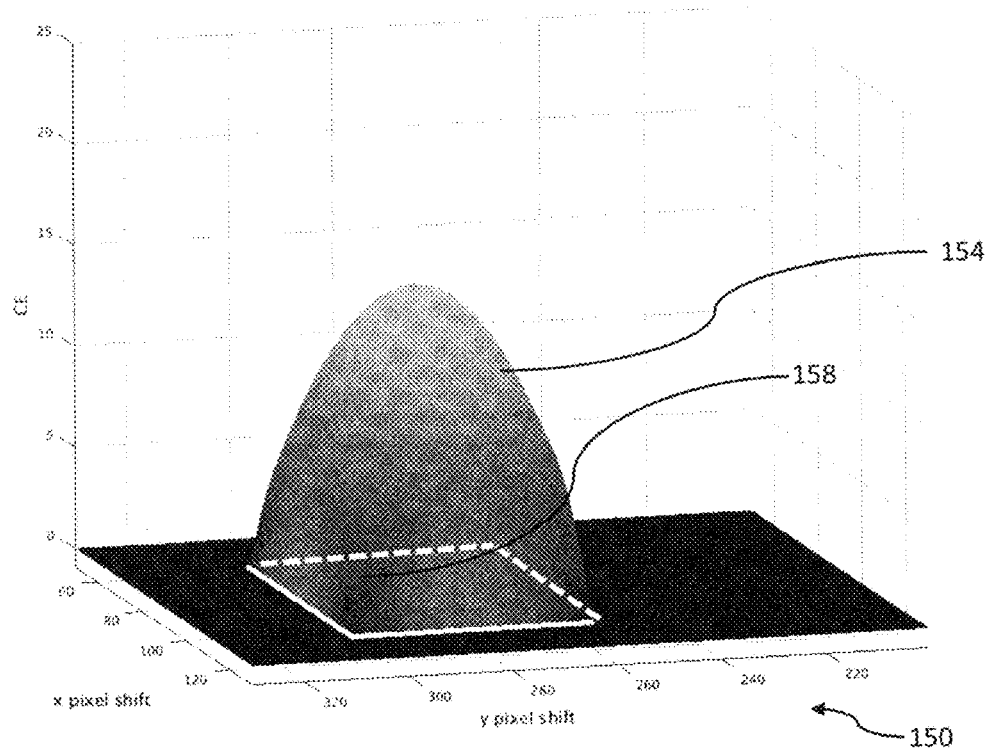
FIGS. 6A and 6B illustrate a sample of a $CE_{VIZ}$ plot provided by the invention and utilizing emphasis regions of different sizes.
Figure 6B:
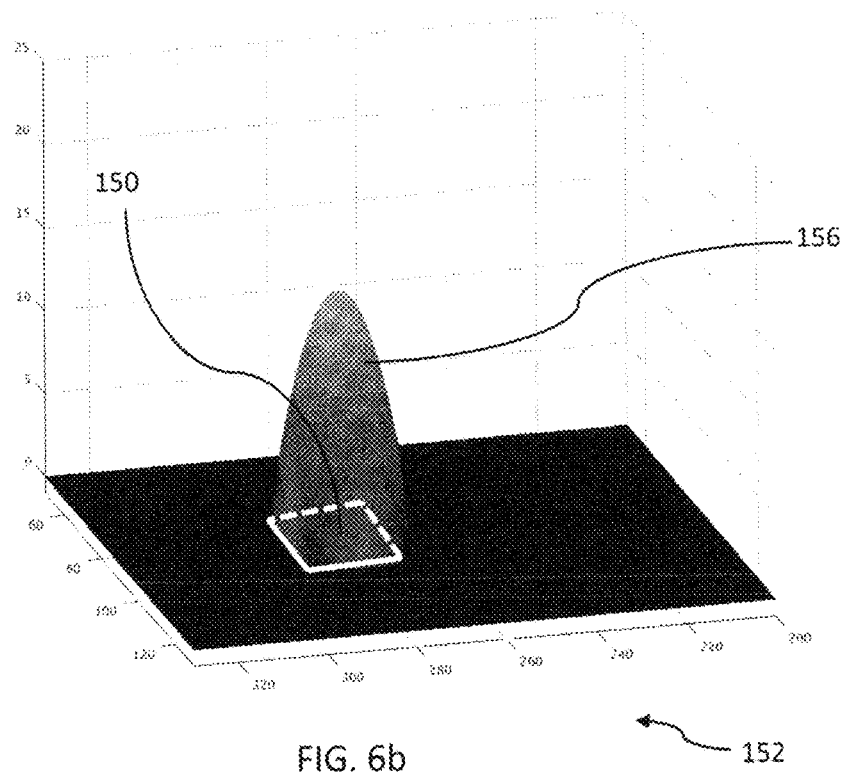

The present invention further provides a visualization tool to assist the analyzer in making the determination as to whether the camera fingerprint, $K_1$, and the query fingerprint, $K_2$, match. At step 140, the size, A, of an emphasis region to be utilized for paraboloid interpretation is selected. For example, A may be selected to be 10×10 pixels or 25×25 pixels. At step 142, a correlation energy providing improved visualization capabilities (i.e., a visualization correlation energy $CE_{VIZ}$), is calculated. $CE_{VIZ}$ is a collection of T paraboloids where each paraboloid corresponds to a shift associated with a member of the high-value NCC subset and each paraboloid has an emphasis region of size A. It is noted that $CE_{VIZ}$ need not include a calculation of the transformed correlation energy for all possible shifts. Rather, $CE_{VIZ}$ only requires calculation of the transformed correlation energy for those shifts associated with the high-value NCC subset utilizing:

$$CE_{viz}(s) = \begin{cases} \left(1 - \frac{d(s, s_i)^2}{\max_{s' \in A_{s_i}} d(s', s_i)^2}\right)CE(s_i), & s \in A_{s_i}, i = 1, \ldots, T \\ 0, & \text{otherwise} \end{cases},$$

where $CE(s_i)$ is the transformed correlation energy; $d(s,s_i)$ is the Euclidean distance between shift s and shift $s_i$; s' is an element of the set $A_{s_i}$; and $A_{s_i}$ is an emphasis region around each of shifts associated with the high-value NCC subset. As noted above, the size of this region may be, for example, 10×10 or 25×25. At step 144, $CE_{VIZ}$ is plotted. The paraboloids may be plotted, using a surface plot or its associated heat map, for example. Mathematical plotting software, such as MATLAB, for example, may be utilized to create the plot. FIGS. 6A and 6B each illustrate a surface plot 150, 152 of a $CE_{viz}$ value. Specifically, a downward-facing elliptic paraboloid 154, 156 is provided in the respective plots 150, 152. Each paraboloid 154, 156 provides a respective emphasis region, 158, 160 of size A.

The plots of FIGS. 6A and 6B illustrate emphasis regions of different sizes. A variety of factors may determine the size of the emphasis region selected. These factors include for example, the number of pixels provided by the fingerprints, the size of the display available to view the plot, the scale at which the plot is to be view, and the subset size, T. For example, if the value of T is increased, the size of the emphasis region may be decreased in order to provide a plot which accommodates each of paraboloids at a visually acceptable scale. Although the surface plots 150, 152 are illustrated without color in FIGS. 6A and 6B, the surface plots are typically illustrated using a spectrum of color for improved visualization. For example, the color of each paraboloid may vary along the height of the paraboloid to further emphasize differentiation in paraboloid heights.

At step 146, the $CE_{THRESH}$ is plotted along with the $CE_{VIZ}$ plot. This step is illustrated in the examples below.

At step 148, the plot is analyzed to determine whether any of the $CE_{VIZ}$ paraboloids exceed $CE_{THRESH}$. With this determination an analysis may be performed to determine whether the camera fingerprint and the query fingerprint match. This analysis may be made in a variety of manners as determined by the user. For example, it may be determined that if a single $CE_{VIZ}$ paraboloid exceeds $CE_{THRESH}$, a determination may be made that the query fingerprint matches the camera fingerprint; and if no transformed $CE_{VIZ}$ paraboloid exceeds $CE_{THRESH}$, a determination may be made that the query fingerprint does not match the camera fingerprint. In another scenario multiple $CE_{VIZ}$ paraboloids may be found to exceed $CE_{THRESH}$. In this scenario, the user may determine that further analysis is required before making a determination as to whether the query fingerprint and the camera fingerprint match. The plot therefore allows evaluation of a set of transformed CE values rather than evaluating each transformed CE value independently. By evaluating the set of CE values, a simple and efficient determination may be made.

Although the method of the invention has been described with the steps presented in a particular order, it is to be understood that the order presented is for illustrative purpose only. Thus, the steps described may be ordered in a variety of manners in accordance with the invention. For example, determination of a set size T, may occur at any time prior to calculation of the universal noise floor. Similarly, the determination of the size of an emphasis region may be made any time prior to creation of the $CE_{VIZ}$ plot. Furthermore, not all steps described are required for the practice of the claimed methods. Further still, in certain embodiments, steps may be performed concurrently rather than sequentially.

The various steps described in connection with the embodiments disclosed herein can be implemented as electronic hardware, computer software, or combinations of both. To clearly illustrate this interchangeability of hardware and software, various illustrative steps have been described above generally in terms of their functionality. Whether such functionality is implemented as hardware or software depends on the particular application and design constraints imposed on the overall system. The described functionality can be implemented in varying ways for each particular application, but such implementation decisions should not be interpreted as causing a departure from the scope of the disclosure.

The various steps described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method or process described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, a DVD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

The following examples are provided in an effort to provide further understanding of the invention and the advantages provided by the invention.

In a first example the images 200, 202, 204 of FIG. 7A were used to provide a camera fingerprint $K_1$. As discussed above, any number of methods may be utilized for determining the camera fingerprint. The query image 210 illustrated in FIG. 7B was used to provide a query fingerprint, $K_2$.

All possible shifts which could provide alignment between the camera fingerprint and the query fingerprint were identified. In this example, the query fingerprint and the camera fingerprint each provide 1000×750 pixels. Thus, 750,000 different possible shifts were identified. For each possible shift, a normalized cross-correlation value was calculated providing a set of 750,000 NCC values. Next, a high-value subset size was set to 50 (i.e. T=50) and the high-value subset of the NCC set was identified. That is to say, the 50 highest NCC values were identified. As will be illustrated below, selection of the size T of the high-value subset will be based upon a number of factors, including, for example, the size of the image (i.e. the number of pixels provided by the image), the size of the emphasis region A; and the calculation speed desired. One goal in selecting the size T of the high-value subset is to provide sufficient data to make a determination as to whether the camera fingerprint and query fingerprint match. If the value of T is set too low, sufficient data may not be provided to differentiate between a match and a non-match. On the other hand if T is set too high, a visual inspection of the data and/or plots is difficult. Furthermore, the noise floor calculation may become inaccurately skewed to the remaining low value NCC set for large T. In addition, selection of T may also be determined based upon a requirement provided for the speed of the calculations. The higher the value of T, the more time that is required to calculate the transformed correlation energy values.

Next, the low-value subset of the NCC set was identified. The low-value subset includes the remaining 749,950 NCC values.

Next, the universal noise floor was calculated based upon the low-value NCC subset. The universal noise floor was calculated as $4.73 \times 10^5$.

For all shifts associated with the 50 highest NCC values, a transformed correlation energy value was determined utilizing the universal noise floor. This step resulted in a set of transformed correlation energy values having 50 values in the set as illustrated in table 220 of FIG. 8.

A $CE_{THRESH}$ value was set to 60.

Next, the 50 transformed correlation energy values were compared to the $CE_{THRESH}$ value. In making this comparison, it was determined that a single transformed correlation energy value exceeded $CE_{THRESH}$. See value 1 associated with shift (0,0) in table 220 of FIG. 8. Specifically, the transformed CE values associated with the shift (0,0) was determined to have a value of 196.527 The remaining transformed CE values (i.e. the remaining 49 values) were well below the $CE_{THRESH}$ value of 60 (e.g. ranging in value from approximately 14 to approximately 24). Thus, a determination was made that the query fingerprint derived from the image of FIG. 7B matches the camera fingerprint derived from the images of FIG. 7A. As a result, the determination was made that the image of FIG. 7B originated from the same camera as the images of FIG. 7A.

Figure 9A:
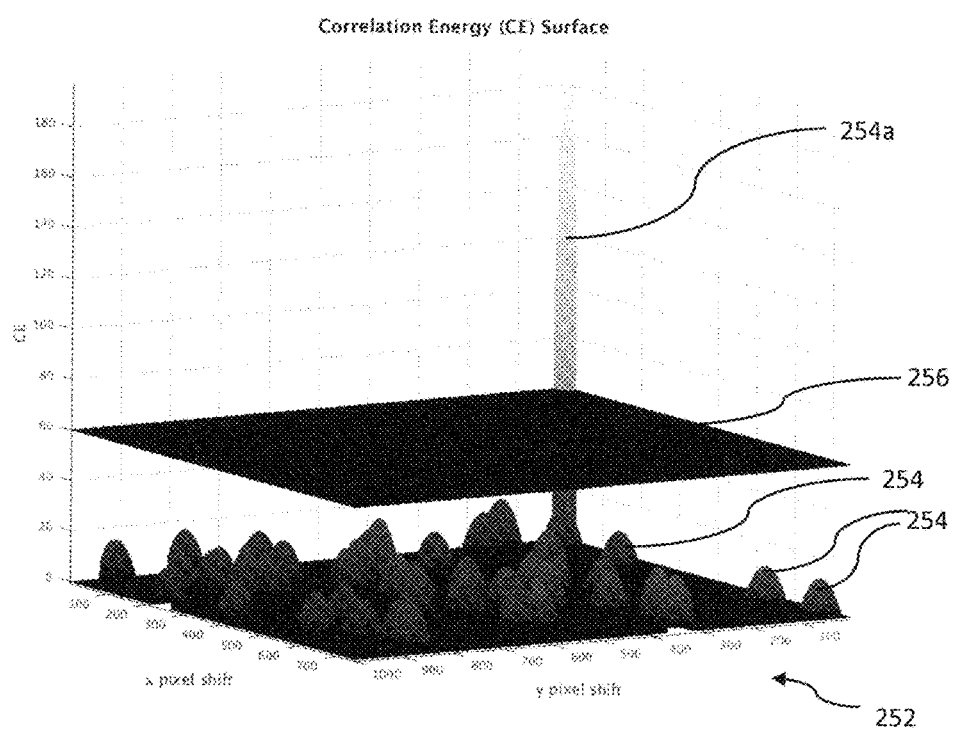
FIG. 9A is a surface $CE_{VIZ}$ plot of the invention, derived from Example 1.
Figure 9B:
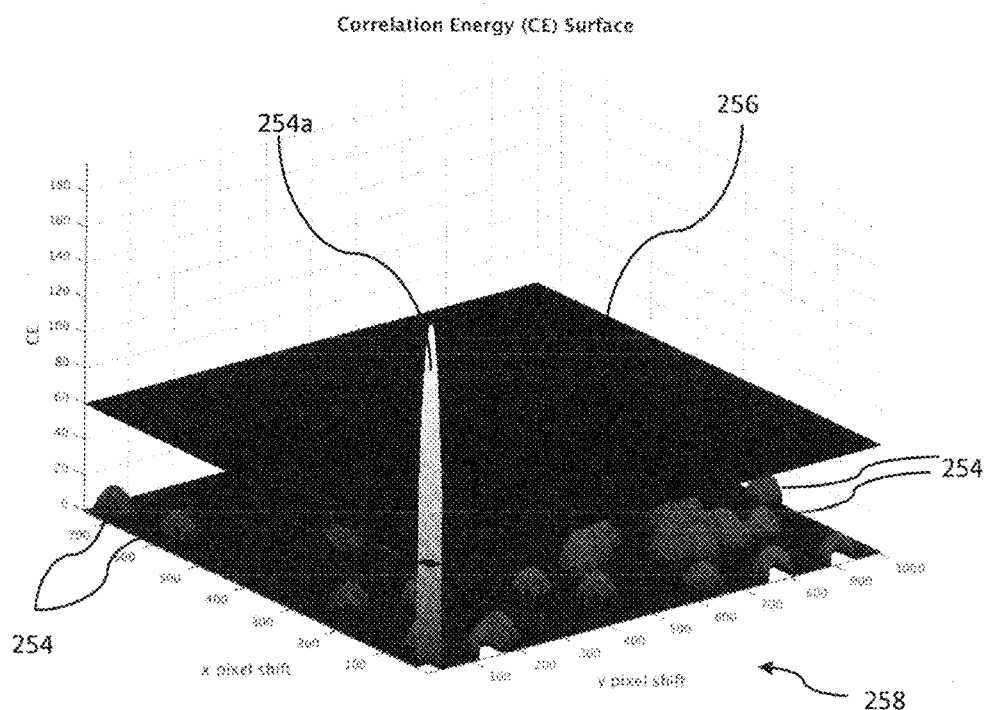
FIG. 9B is an alternative view of the $CE_{VIZ}$ plot of FIG. 8A.

Further, the visualization tool of the invention was utilized to evaluate the fingerprints. Specifically, the size of an emphasis region, A, was selected to be a 25×25 square region. Next, utilizing the emphasis region size of 10, a visualization CE ($CE_{VIZ}$) was calculated for each of the shifts associated with the 50 highest NCC values and these $CE_{VIZ}$ paraboloids 254 were plotted as shown in FIG. 9A to provide a surface $CE_{VIZ}$ plot 252. Shifts in the horizontal and vertical directions are represented by the x and y axis. As illustrated in FIG. 9A, each downward facing elliptic paraboloid 254 includes an emphasis region of size 25×25. FIG. 9B illustrates an alternative view 258 of the plot of FIG. 9A including the downward facing elliptic paraboloids 254.

Next, the correlation energy threshold, $CE_{THRESH}$, 256 was plotted as illustrated in FIGS. 9A and 9B.

Finally, a visual analysis of the plots in FIG. 9A and FIG. 9B is performed. Initially, it is noted that selection of the value 50 for the high-value subset size T provides sufficient data for a meaningful analysis of the correlation energy and selection 25×25 as the size of the emphasis region provides paraboloids of sufficient size to easily visualize the correlation energy. A quick study of the plots 252, 258 allows the analyzer to easily determine that a single paraboloid 250a at (0,0) exceeds $CE_{THRESH}$ 256. Specifically, the paraboloid 250a at shift (0,0) extends well beyond $CE_{THRESH}$ 256 and the remaining paraboloids 250 reside well below $CE_{THRESH}$ 256. The plots 252, 258 support the determination that the camera fingerprint matches the query fingerprint. Thus, conclusion that the query image in FIG. 7B originated from the camera utilized to take the images of FIG. 7A is supported by the plots 252, 254.

A comparison of the method of the invention is made to the method of the prior art. The same camera and query fingerprints derived from the images of FIGS. 7A and 7B respectively were utilized. All possible shifts which could provide alignment between the camera fingerprint and the query fingerprint were identified. Again, in this example, the query fingerprint and camera fingerprint each provide 1000× 750 pixels. Thus 750,000 different possible shifts were identified. For each possible shift, a normalized cross-correlation value was calculated providing a set of 750,000 NCC values. Next, a set of CE values were calculated utilizing:

$$CE = \frac{\rho(s_x, s_y; K_1, K_2)^2}{\frac{1}{mn - |N|} \sum_{s,s \notin Ns} \rho(s_x, s_y; K_1, K_2)^2}$$

Figure 3:
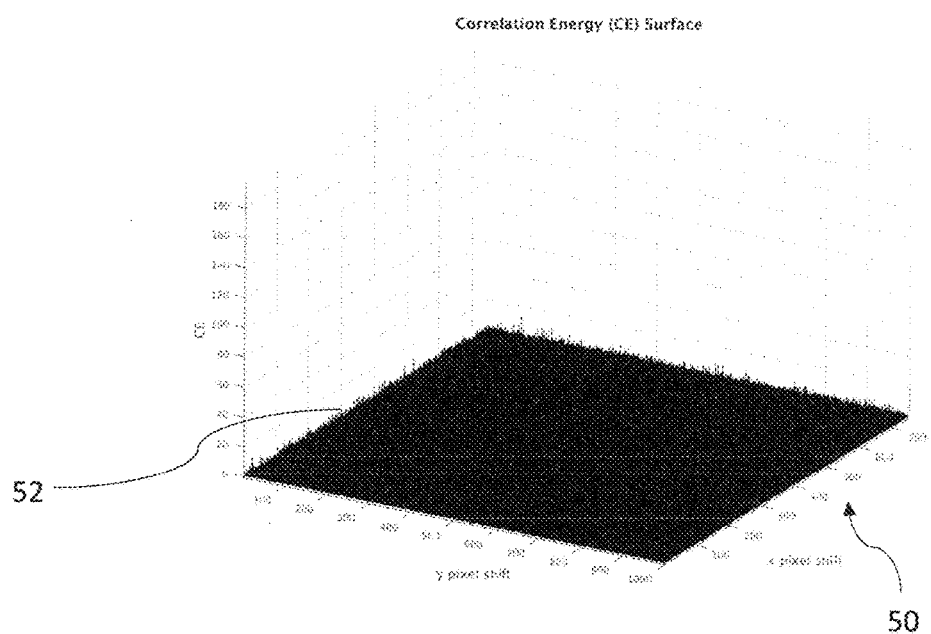
FIG. 3 illustrates a plot of CE values derived from a prior art method.

The set of CE values included 750,000 values. Specifically, the calculation of each CE value required identification of a shift-specific neighborhood followed by a calculation of a shift-specific noise floor. FIG. 3 provides a plot 50 of the CE values. Specifically, each of the 750,000 CE values is plotted using a vertical line 52 having a height representative of the CE value. A peak CE value of 159 is plotted at (0, 0), however this peak CE value is not noticeable in FIG. 3. This CE value is above the threshold CE value of 60, which if visible could provide strong evidence that the image in FIG. 7B originated from the same camera as the images in FIG. 7A.

Despite the strong evidence provided by the calculated CE values, strong evidence is not provided by the plot. As illustrated in FIG. 3, none of the plotted vertical lines is clearly identifiable as having a height greater than the remaining vertical lines and therefore it is difficult to assess whether any of the shifts support the hypothesis that the query image originated from the camera in question. Given the vast quantity of pixels and the relative size of a typical viewing window, individual lines are difficult to identify. In particular, for unusually large CE values at a pixel, the isolation of this value, paired with the thinness of the line, makes it nearly impossible to detect. It then becomes necessary to search the viewing area for peaks, by zooming or rotating, or by simply using the software to search to the values. This defeats the purpose of the visualization; i.e., to offer instantaneous, visual, and qualitative information about the function.

The plot 50 of FIG. 3 can be contrasted with the plots 252, 258 of FIGS. 9A and 9B where the existence of single peak extending over the threshold is clear. As a result, it is abundantly clear from FIGS. 9A and 9B that the image of FIG. 7B originated from the camera producing the images of FIG. 7A.

Finally, a comparison was made of the time required to calculate the CE values plotted in FIG. 3 and the transformed CE values plotted in FIGS. 9A and 9B.

| Example | CE with shift-specific noise floor (secs/megapixel) | Transformed CE with universal noise floor (secs/megapixel) | Speed-up factor |
|---|---|---|---|
| 1 | 10,278.9 | 0.06 | 171,315 |

As illustrated by the table, calculation of the transformed CE values utilizing the universal noise floor is performed remarkably faster than the calculation of the CE values utilizing a shift-specific noise floor.

Example 2

Figures 10, 11:
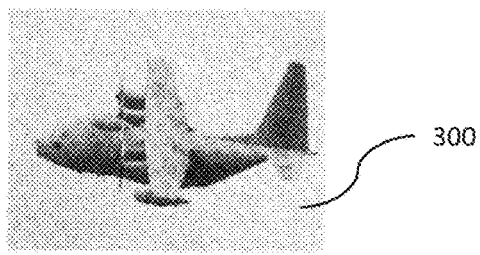
FIG. 10 illustrates an image used to create a query fingerprint described in Example 2
FIG. 11 illustrates a table of transformed CE values derived from Example 2.
Figure 12:
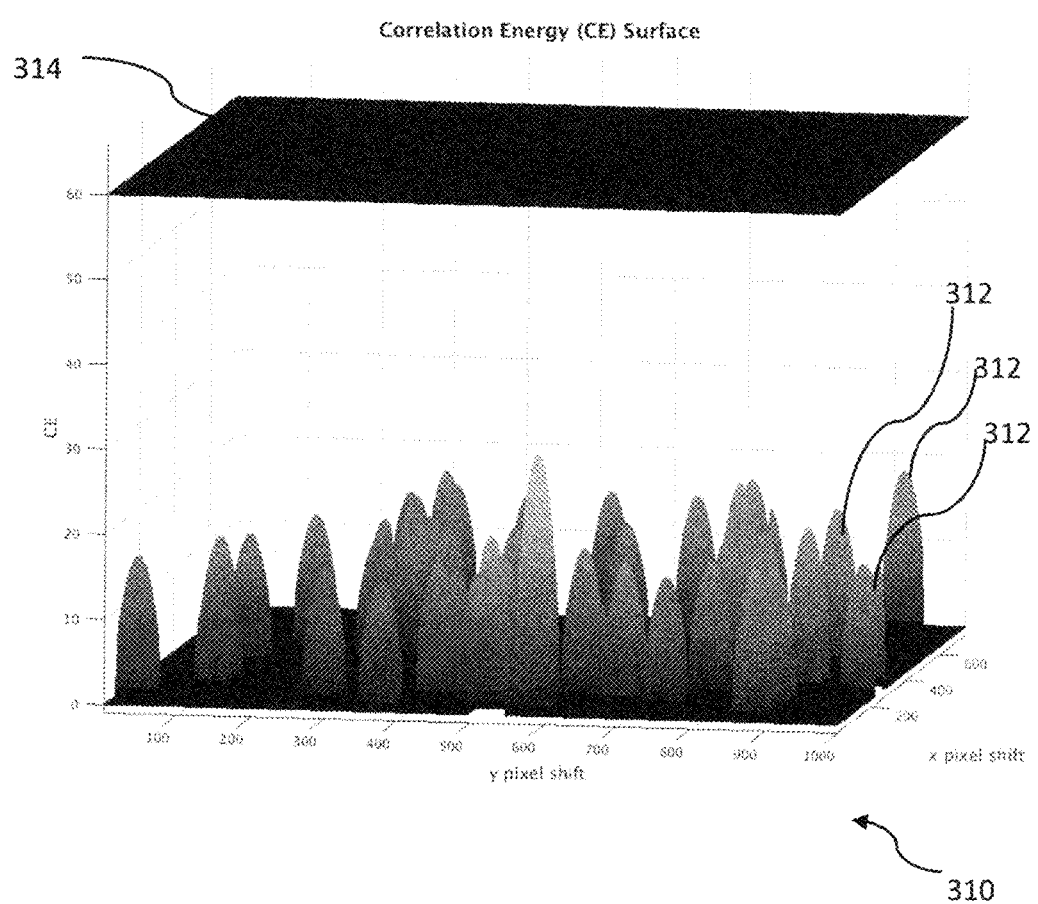
FIG. 12 is a surface $CE_{VIZ}$ plot derived from Example 2.

A second example is illustrated in FIGS. 10-12. This second example, demonstrates transformed correlation energy values and a $CE_{viz}$ plot relating to query image 300 (See FIG. 10) that did not originate from the camera in question. For convenience, we use the camera fingerprint generated from the images of FIG. 7A. The query image 300 was used to provide a query fingerprint, $K_2$.

All possible shifts which could provide alignment between the camera fingerprint and the query fingerprint were identified. In this example, the query image 300 and fingerprint each provide 1000×750 pixels. Thus, 750,000 different possible shifts were identified. For each possible shift, a normalized cross-correlation value was calculated providing a set of 750,000 NCC values. Next, a high-value subset size was selected to be 50 (i.e. T=50) and the high-value subset of the NCC set was identified. That is to say the 50 highest NCC values were identified.

Next, the low-value subset of the NCC set was identified. The low-value subset includes the remaining 749,950 NCC values.

Next, the universal noise floor was calculated based upon the low-value NCC subset. The universal noise floor was calculated as $2.02 \times 10^{-5}$.

For all shifts associated with the 50 highest NCC values, a transformed correlation energy value was determined utilizing the universal noise floor. This step resulted in a set of transformed correlation energy values having 50 values in the set as illustrated in table 302 of FIG. 11.

A correlation energy threshold, $CE_{THRESH}$, was set to 60.

Next, the 50 transformed correlation energy values were compared to the $CE_{THRESH}$ value. In making this comparison, it was determined that none of the transformed correlation energy values exceeded $CE_{THRESH}$. It was further determined that each of the transformed correlation energy values fell within the range of approximately 14-30. Thus, a determination was made that the query fingerprint derived from the image of FIG. 10 does not match the camera fingerprint derived from the images of FIG. 7A. As a result, the determination was made that the image of FIG. 10 did not originate from the same camera as the images of FIG. 7A.

Further, a visualization tool of the invention was utilized to evaluate the fingerprints. Specifically, the size of an emphasis region, A, was selected to be 10. Next, utilizing the emphasis region size of 10, a visualization CE ($CE_{VIZ}$) was calculated for each of the shifts associated with the 50 highest NCC values and a surface plot 310 was created as illustrated in FIG. 12. The surface plot 310 provides a collection of paraboloids 312, $CE_{VIZ}$. As illustrated in FIG. 12, each downward facing elliptic paraboloid 312 includes an emphasis region of size 10.

Next, $CE_{THRESH}$ 314 was plotted as illustrated in FIG. 12.

Finally, a visual analysis of the plot in FIG. 12 was performed. A quick study of the plot allows the analyzer to easily determine that none of the paraboloids 312 exceed $CE_{THRESH}$ 314, and several of the paraboloids fall within the range of approximately 14 to 30. These findings support the determination that the camera fingerprint does not match the query fingerprint. Thus, the conclusion that the query image in FIG. 10 did not originate from the camera utilized to take the images of FIG. 7A is supported by the plot 310.

Finally, a comparison was made of the time required to calculate the CE values utilizing a shift specific noise floor and the transformed CE values plotted in FIG. 12.

| Example | CE with shift-specific noise floor (secs/megapixel) | Transformed CE with universal noise floor (secs/megapixel) | Speed-up factor |
| --- | --- | --- | --- |
| 2 | 9,994.9 | 0.06 | 166,582 |

As illustrated by the table, calculation of the transformed CE values is performed remarkably faster than the calculation of the CE values utilizing a shift-specific noise floor.

Example 3

Figure 13A:
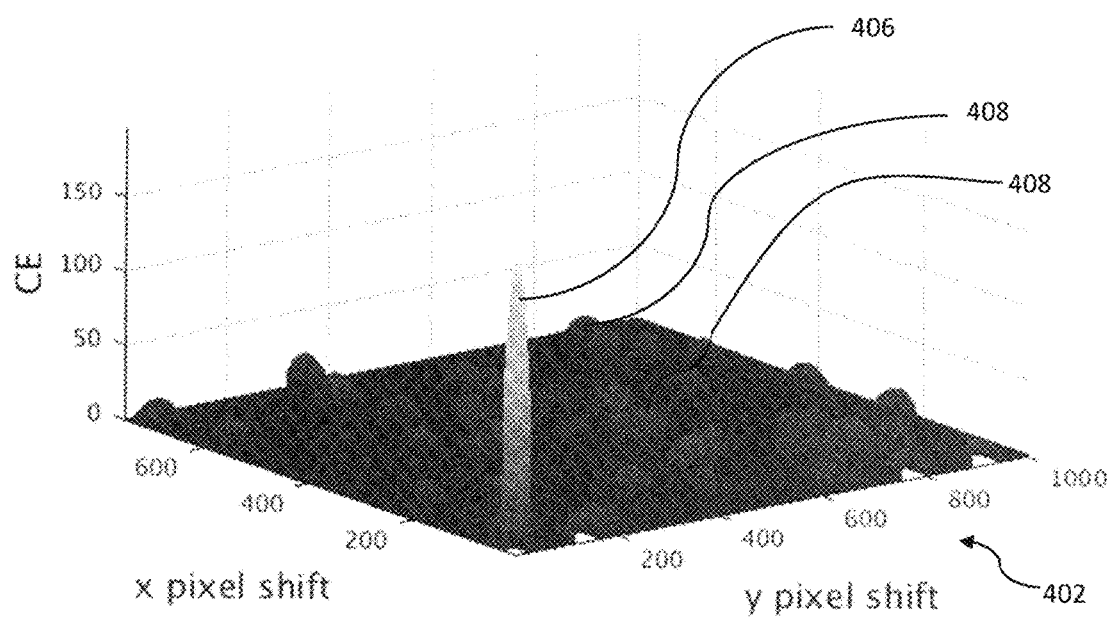
FIGS. 13A and 13B illustrate surface $CE_{VIZ}$ plots provided for comparison of a matching fingerprint plot and a non-matching fingerprint plot.
Figure 13B:
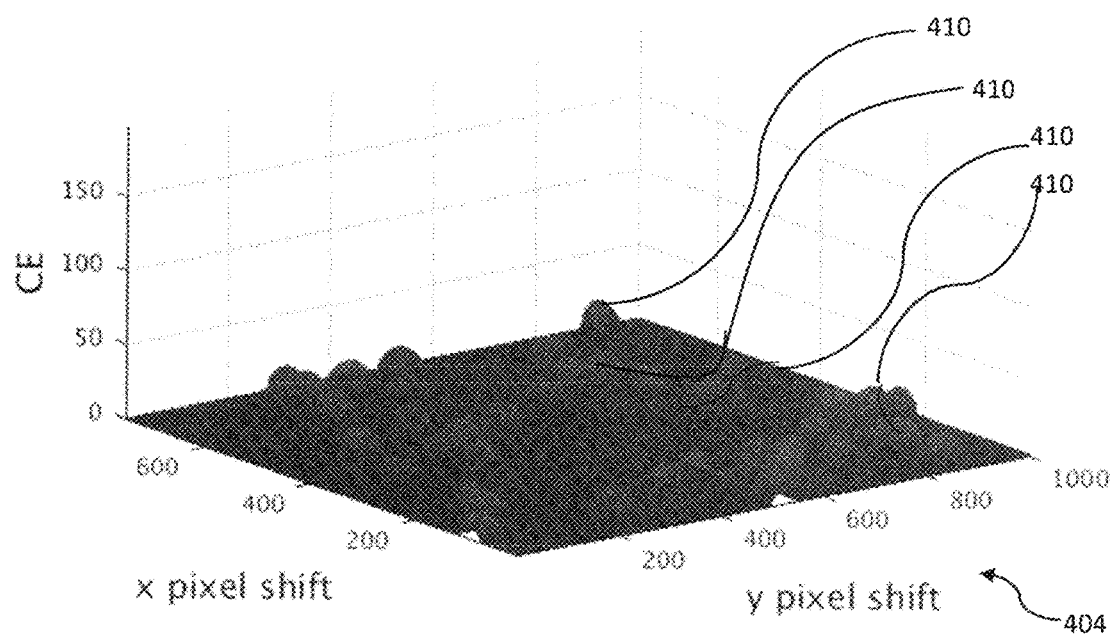

The visualization tool further offers an easy means of comparing sets of CE values; i.e. for comparing one query fingerprint analysis to another query fingerprint analysis. FIG. 13A provides a $CE_{VIZ}$ surface plot. The pronounced paraboloid 406 at (0, 0) indicates that the fingerprint derived from the query image(s) matches the camera fingerprint. This clearly pronounced paraboloid in combination with the fact that the remaining paraboloids (a few of which have been identified with reference 408) do not exceed 60, suggests that the query fingerprint matches the camera fingerprint. FIG. 13B provides a $CE_{VIZ}$ surface plot 404. Each of the paraboloids 410 of the plot 404 have a low height. This lack of a pronounced paraboloid indicates that the fingerprint derived from the query image(s) does not match the camera fingerprint. In this manner an easy side-by-side comparison is provided. For example, if the plots 402 and 404 were derived using the same camera fingerprint but different query fingerprints, a side-by-side comparison of the plots 402 and 404 allows the evaluator to determine that the query fingerprint of plot 402 was derived from the camera evaluated but the query fingerprint of plot 404 was not derived from the camera evaluated. In this manner, many query fingerprints may be quickly evaluated and identified as a match or a non-match with the camera in question. Similar comparison can be made of multiple camera fingerprints. For example, if plots 402 and 404 were derived using the same query fingerprints but different camera fingerprints, the side-by-side comparison of the plots 402 and 404 allows the evaluator to determine that the camera of the plot 402 was used to create the query fingerprint and the camera of plot 404 was not used to create the query fingerprint.

Figures 13C, 13D:
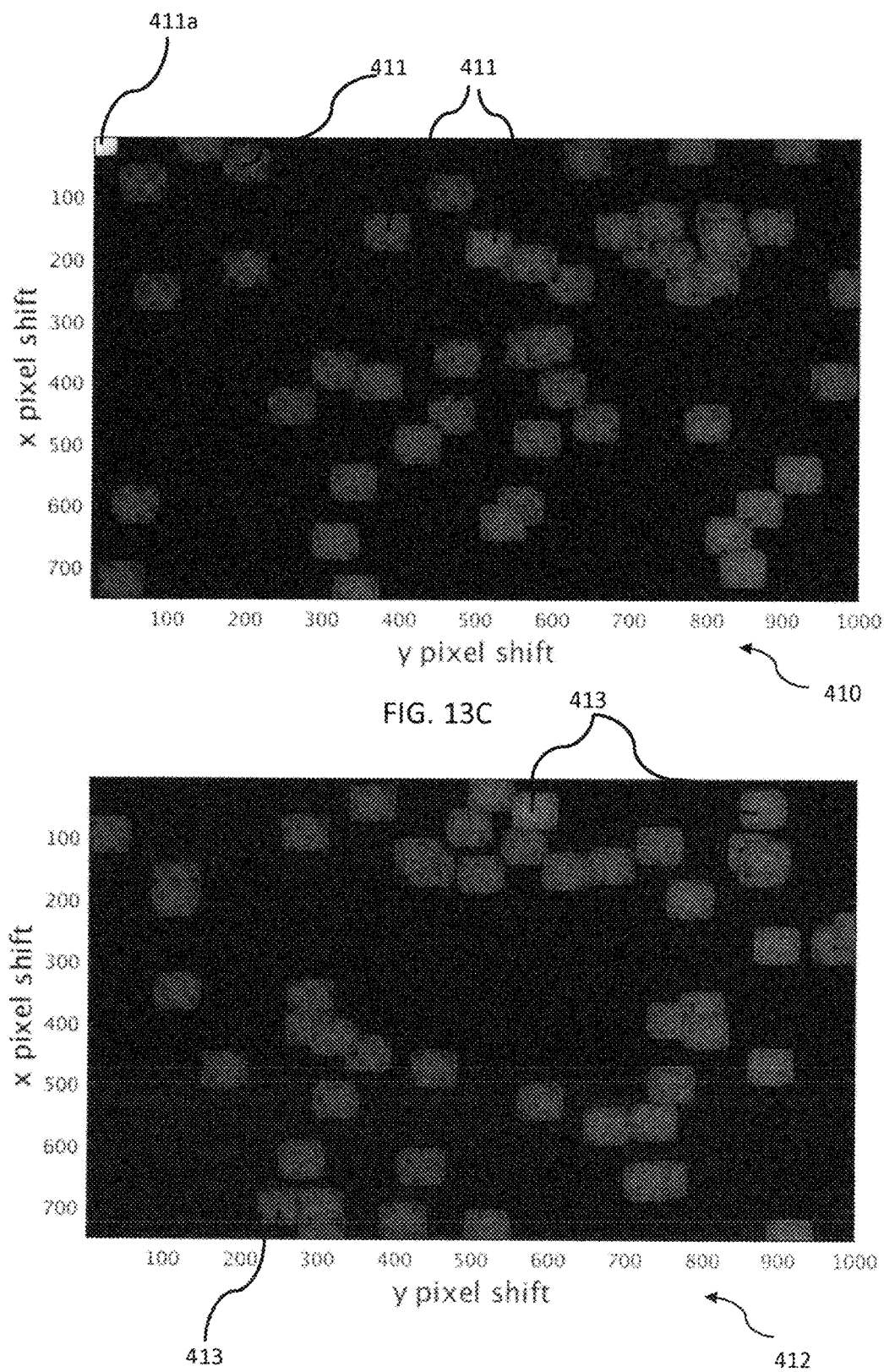
FIGS. 13C and 13D illustrate heat map $CE_{VIZ}$ plots provided for comparison of a matching fingerprint plot and a non-matching fingerprint plot.

FIGS. 13C and 13D provide plots utilizing heat maps rather than surfaces. Although illustrated in FIGS. 13C and 13D in black and white, heat maps may utilize color to further emphasize differences in the varying intensity. In FIGS. 13C and 13D, areas of the greatest intensity are identified as white, areas of lesser intensity are displayed as gray and areas of the least/no intensity are displayed as black. FIG. 13C provides a heat map $CE_{VIZ}$ plot 410, including a plurality of intensity areas 411. The size of these areas of intensity 411 is determined by the selected size of the emphasis region, A, as discussed above. Plot 410 includes a single area 411*a* of high intensity; i.e. the white area at location (0, 0) indicating that the query fingerprint and the camera fingerprint match. FIG. 13D provides a heat map $CE_{VIZ}$ plot 412 with areas of intensity 413. The plot 412 does not include any white areas but rather only a plurality of gray areas 413 indicating that the query fingerprint and the camera fingerprint do not match. As with the plots 402 and 404, side-by-side comparison of the plots 410 and 412, demonstrates the ability provided by the invention to clearly distinguish between matching and non-matching fingerprints.

The invention provides significant advantages over prior art methods of fingerprint comparison. It is noted that the invention provides a universal noise floor calculation for fingerprints which is used to calculate a transformed correlation energy. In addition, to providing a more accurate representation of the noise floor (i.e. one appropriately suited for fingerprints rather than images), calculation of the transformed correlation energy utilizing this universal noise floor eliminates the need for performing shift-specific noise floor calculations.

In addition to the simplified calculations provided by the transformed correlation energy, the invention provides for comparison of the fingerprints with only a fraction of the correlation energy calculations required by prior art methods. The $CE_{VIZ}$ plots of the present invention, only require paraboloids for the top T NCC values. Thus, a significant reduction in the time required to perform the correlation energy calculations is achieved. The downward-facing elliptic paraboloids provided at each shift associated with the top T NCC values, allows for clear visualization of $CE_{VIZ}$ values and a quick assessment as to whether a match is provided between the camera fingerprint and the query fingerprint.

While the above description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that may not provide all of the features and benefits set forth herein, as some features can be used or practiced separately from others. The scope of the invention is indicated by the appended claims rather than the foregoing description. All changes which come within the meaning and range of equivalency of the claims are to be embraced within their scope.

The invention claimed is:

1. A method for comparing a camera fingerprint and a query fingerprint comprising the steps of:
    identifying a camera fingerprint, represented by a matrix of real numbers;
    identifying a query fingerprint, represented by a matrix of real numbers;
    identifying a plurality of possible shifts for alignment of said camera fingerprint and said query fingerprint,
    for each possible shift identified, calculating a normalized cross-correlation value, between said camera fingerprint and said query fingerprint, to provide a normalized cross-correlation set;
    determining a high-value subset size, for a high-value subset of said normalized cross-correlation set;
    from said possible shifts, identifying shifts associated with said high-value subset;
    identifying a low-value subset;
    determining a universal noise floor based upon the low-value subset;
    for each said identified shift associated with said high-value subset, determining a transformed correlation energy value utilizing said universal noise floor; and
    determining whether said camera fingerprint and said query fingerprint match based upon an evaluation of said transformed correlation energy values.

2. The method of claim 1 further including the steps of:
    determining a correlation energy threshold; and
    comparing said transformed correlation energy values and said correlation energy threshold.

3. A method for comparing a camera fingerprint and a query fingerprint comprising the steps of:
    identifying a camera fingerprint, represented by a matrix of real numbers;
    identifying a query fingerprint, represented by a matrix of real numbers;
    identifying a plurality of possible shifts for alignment of said camera fingerprint and said query fingerprint,
    for each possible shift identified, calculating a normalized cross-correlation value, between said camera fingerprint and said query fingerprint, to provide a normalized cross-correlation set;
    determining a high-value subset size, for a high-value subset of said normalized cross-correlation set;
    from said possible shifts, identifying shifts associated with said high-value subset;
    identifying a low-value subset;
    determining a universal noise floor based upon the low-value subset;
    for each said identified shift associated with said high-value subset, determining a transformed correlation energy value utilizing said universal noise floor; and
    determining an emphasis region size;
    determining a visualization correlation energy utilizing said emphasis region size and said transformed correlation energy; and
    plotting said visualization correlation energy to provide a plot.

4. The method of claim 3, further including the steps of:
    determining whether said camera fingerprint and said query fingerprint match based upon an evaluation of said plot to determine whether said camera fingerprint and said query fingerprint match.

5. The method of claim 3, wherein said plot is a surface.

6. The method of claim 3, wherein said plot is a heat map.

7. The method of claim 3, further including the step of: selecting a correlation energy threshold.

8. The method of claim 3, wherein said correlation energy threshold is defined as approximately 60.

9. The invention of claim 3, wherein the high-value subset size is approximately 50.

10. The method of claim 3, wherein a first plot is derived from a first query fingerprint and a second plot is derived from a second query fingerprint; and further comprising the step of comparing said first plot and said second plot.

11. A non-transitory computer-readable medium having instructions stored thereon, wherein execution of the instructions by a computer processor causes the computer processor to perform a method of comparing a camera fingerprint and a query fingerprint, the method comprising:
    identifying a camera fingerprint, represented by a matrix of real numbers;
    identifying a query fingerprint, represented by a matrix of real numbers;
    identifying a plurality of possible shifts for alignment of said camera fingerprint and said query fingerprint,
    for each possible shift identified, calculating a normalized cross-correlation value, between said camera fingerprint and said query fingerprint, to provide a normalized cross-correlation set;
    determining a high-value subset size, for a high-value subset of said normalized cross-correlation set;

from said possible shifts, identifying shifts associated with said high-value subset;

identifying a low-value subset;

determining a universal noise floor based upon the low-value subset;

for each said identified shift associated with said high-value subset, determining a transformed correlation energy value utilizing said universal noise floor; and utilizing said transformed correlation energy values to determine whether said camera fingerprint and said query fingerprint match.

12. The computer-readable medium in accordance with claim 11, wherein the method further comprises the steps of:

determining an emphasis region size;

for each said identified shift associated with said high-value subset, determining a visualization correlation energy utilizing said emphasis region size and said transformed correlation energy; and plotting a visualization correlation energy and displaying said plot.

13. The computer-readable medium of claim 12, further including the step of:

utilizing said plot to determine whether said camera fingerprint and said query fingerprint match.

14. The computer-readable medium of claim 11, further including the step of:

plotting said correlation energy threshold.

\* \* \* \* \*